US006981940B2

(12) United States Patent
Rafferty

(10) Patent No.: US 6,981,940 B2
(45) Date of Patent: Jan. 3, 2006

(54) CENTRIFUGE CONTROL SYSTEM WITH POWER LOSS RIDE THROUGH

(75) Inventor: Bernard Rafferty, Hellertown, PA (US)

(73) Assignee: ABB Inc., Norwalk, CT (US)

( * ) Notice: Subject to any disclaimer, the term of this patent is extended or adjusted under 35 U.S.C. 154(b) by 232 days.

(21) Appl. No.: 10/601,682

(22) Filed: Jun. 23, 2003

(65) Prior Publication Data

US 2004/0259710 A1  Dec. 23, 2004

(51) Int. Cl.
*B04B 1/20* (2006.01)
*B04B 9/10* (2006.01)
*B04B 13/00* (2006.01)

(52) U.S. Cl. ............................ 494/7; 494/15; 494/53; 494/84

(58) Field of Classification Search ............... 494/1, 494/7–9, 15, 37, 83, 84, 10, 11, 52–54; 210/143, 210/145; 184/6.1
See application file for complete search history.

(56) References Cited

U.S. PATENT DOCUMENTS

| | | | |
|---|---|---|---|
| 3,285,506 A * | 11/1966 | Reed | |
| 4,941,866 A | 7/1990 | Gorodissky et al. | |
| 5,203,762 A * | 4/1993 | Cooperstein | |
| 5,342,279 A * | 8/1994 | Cooperstein | |
| 5,364,335 A * | 11/1994 | Franzen et al. | |
| 5,403,260 A * | 4/1995 | Hensley | |
| 5,681,256 A * | 10/1997 | Nagafuji | |
| 5,714,858 A * | 2/1998 | Pieralisi | |
| 5,816,212 A | 10/1998 | Lindquist et al. | |
| 5,857,955 A * | 1/1999 | Phillips et al. | |
| 5,919,123 A * | 7/1999 | Phillips | |
| 6,368,264 B1 * | 4/2002 | Phillips et al. | |
| 6,600,278 B1 * | 7/2003 | Bretzius | |
| 6,860,845 B1 * | 3/2005 | Miller et al. | 494/53 |
| 6,905,452 B1 * | 6/2005 | Kirsch | 494/53 |
| 2004/0138040 A1 * | 7/2004 | Hensley et al. | 494/84 |
| 2004/0259710 A1 * | 12/2004 | Rafferty | |

FOREIGN PATENT DOCUMENTS

| | | | |
|---|---|---|---|
| EP | 469944 A2 | * | 2/1992 |
| JP | 60-206458 | * | 10/1985 |
| JP | 62-106855 | * | 5/1987 |

* cited by examiner

*Primary Examiner*—Charles E. Cooley
(74) *Attorney, Agent, or Firm*—Michael M. Rickin

(57) ABSTRACT

A control system for a centrifuge that allows the centrifuge to continue to run when there is a short duration failure or outage of the AC power source. The control system allows the centrifuge to be brought to a stop in a normal shutdown mode where there are longer duration failures or outages of the AC power source. This allows power to be maintained to the pump that lubricates the centrifuge bearings so that the bearings are lubricated during the coast down of the centrifuge and the differential speed of the centrifuge to be controlled during coast down allowing the centrifuge bowl to be cleared of solids so that the centrifuge can be immediately started up at lower vibration levels once power is restored.

15 Claims, 1 Drawing Sheet

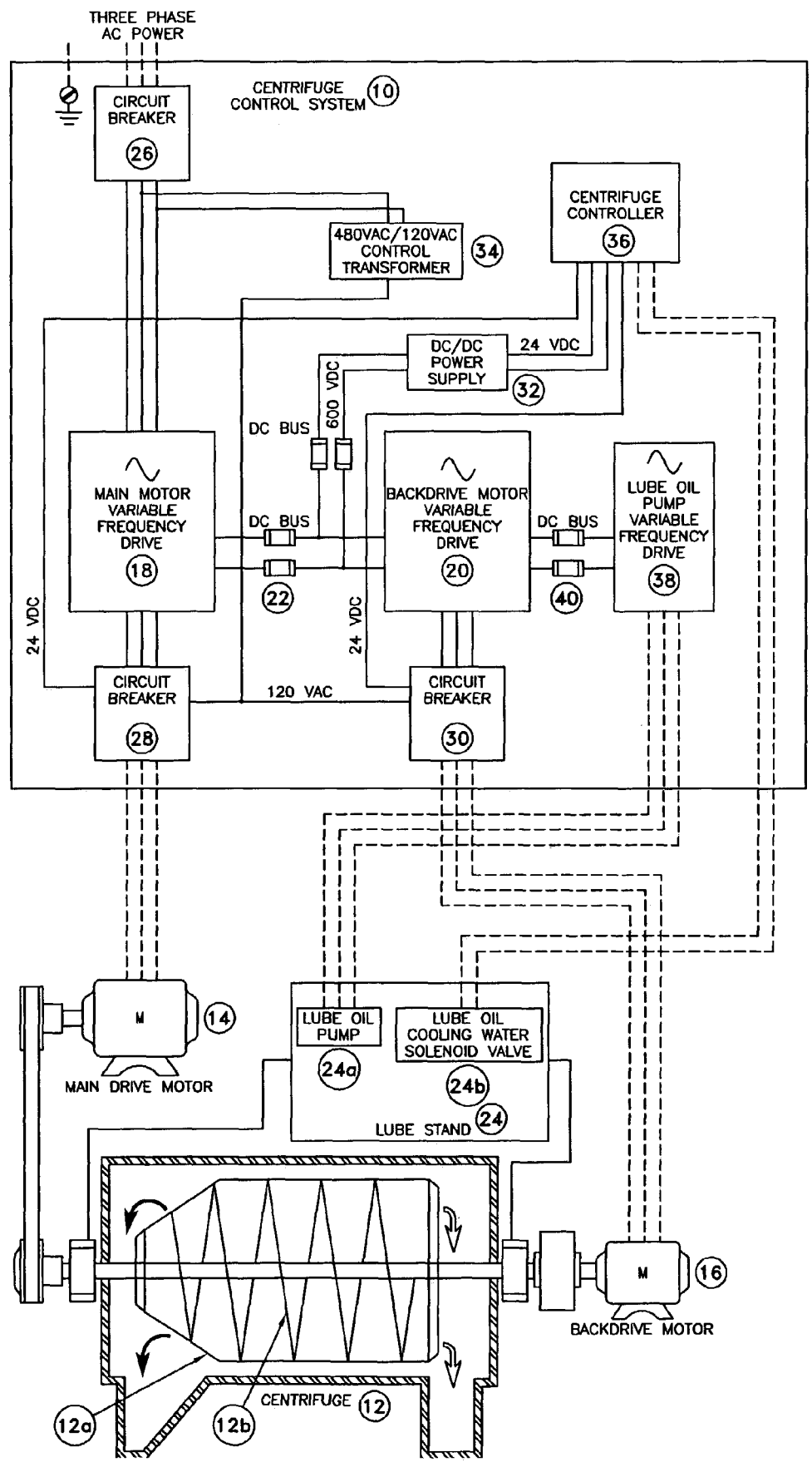

CENTRIFUGE CONTROL SYSTEM WITH POWER LOSS RIDE THROUGH

FIELD OF THE INVENTION

This invention relates to decanter centrifuges and more particularly to control of the centrifuge during either a short or long duration loss or outage of the input power.

DESCRIPTION OF THE PRIOR ART

Decanter centrifuges are used in applications such as wastewater treatment to separate a fluid feed mixture into its constituent parts. As is shown in the only drawing FIGURE, a decanter centrifuge system is typically comprised of a decanter centrifuge 12 that has a rotatable bowl 12a having a coaxially mounted screw conveyor 12b mounted therein. The bowl 12a is rotated to create a centrifugal force to separate a fluid feed mixture into its constituent parts. The heavier portion of the feed, typically called solids because of its, at least partially, conveyable nature, collects on the inner surface of the bowl 12a due to centrifugal force.

The screw conveyor 12b is rotated at a relative speed with respect to the bowl 12a. This differential rotation creates a differential action between the flights of the screw and the bowl wall resulting in the conveyance of the solids along the bowl wall. This differential speed can be varied during the operation of the centrifuge 12 depending on certain parameters and the desired output qualities of the separated constituent parts of the feed mixture. The light or liquid portion of the feed moves radially inward of the heavier solids as a result of the centrifugal force. Thereafter, the separated heavy and light materials are separately discharged, typically from opposite ends of the bowl 12a.

A maindrive motor 14 and a backdrive motor 16 are used to create the differential speed between the bowl 12a and the conveyor 12b of centrifuge 12. The decanter centrifuge system also comprises a centrifuge control system 10 that has, a maindrive variable frequency drive (VFD) 18 connected by a circuit breaker 28 to drive maindrive motor 14 and a backdrive VFD 20 connected by a circuit breaker 30 to drive backdrive motor 16. Some decanter backdrive motors act as regenerative devices that require a method for dissipating the regenerative energy produced by the centrifuge process.

As is described in U.S. Pat. No. 5,203,762 the dissipation of the regenerative energy can be achieved by connecting the backdrive VFD 20 to the maindrive VFD 18 through a common DC bus, such as bus 22 of the drawing figure, or with a separate DC to AC converter to put energy back unto the AC power line. As is described in U.S. patent application Ser. No. 10/094,374 which was filed on Mar. 8, 2002, now U.S. Pat. No. 6,600,278, the disclosure of which is hereby incorporated herein by reference, a clean power bus drive system can be created for decanter centrifuges by using a M1 pulse VED for the main drive and a M2 pulse VFD for the backdrive to give rise to a N pulse VFD where N=M1+M2.

As is also shown in, the only drawing figure, a lube stand 24 is associated with decanter centrifuge 12. The lube stand typically comprises a lube oil pump 24a, which provides lubrication to the bearings of centrifuge 12, and a lube oil cooling water solenoid valve 24b.

Electrical power is provided to centrifuge control system 10 from a three phase AC power source (not shown in the drawing FIGURE) which is connected by a circuit breaker 26 to maindrive VFD 18. Circuit breaker 26 is also connected to a transformer 34 so that the three phase AC source can provide 120 VAC to circuit breakers 28 and 30.

It is desirable for a short duration failure or outage of the AC power source to maintain centrifuge control system 10 and thus centrifuge 12 running in a non-interrupt mode. It is also desirable for longer duration failures or outages of the AC power source to allow centrifuge 12 to be brought to a stop in a normal shutdown mode. This allows the centrifuge control system 10 to maintain power to lube oil pump 24a to thereby continue to lubricate the centrifuge bearings during the coast down of the centrifuge 12 that will occur during a longer duration power failure. This also allows the control system 10 to maintain control of the centrifuge differential speed during coast down to thereby clear the bowl 12a of solids which decreases maintenance time and allows for an immediate startup of the centrifuge at lower vibration levels once power is restored.

SUMMARY OF THE INVENTION

A control system for a decanter centrifuge, the decanter centrifuge when rotating having kinetic energy. The control system comprises:

(a) a variable frequency drive receiving power from an AC source and connected to a main drive motor, the main drive motor for rotating a bowl of the decanter centrifuge;

(b) a variable frequency drive connected to a back drive motor, the back drive motor for rotating a conveyor of the decanter centrifuge;

(c) a common DC bus connected to the variable frequency drive connected to the main drive motor and to the variable frequency drive connected to the back drive motor;

(d) means connected to the common DC bus and a stand for providing lubrication to the decanter centrifuge for controlling the lubrication stand;

the decanter centrifuge kinetic energy providing through the variable frequency drive connected to the main drive motor power for the DC bus in the absence of power from the AC source.

A control system for a decanter centrifuge, the decanter centrifuge when rotating having kinetic energy. The control system comprises:

(a) a variable frequency drive receiving power from an AC source and connected to a main drive motor, the main drive motor for rotating a bowl of the decanter centrifuge;

(b) a variable frequency drive connected to a back drive motor, the back drive motor for rotating a conveyor of decanter centrifuge;

(c) a common DC bus connected to the variable frequency drive connected to the main drive motor and to the variable frequency drive connected to the back drive motor;

(d) means connected to the common DC bus for providing lubrication to the decanter centrifuge;

the decanter centrifuge kinetic energy providing through the variable frequency drive connected to the main drive motor power for the DC bus in the absence of power from the AC source.

In combination, a decanter centrifuge comprising a bowl and a conveyor, the decanter centrifuge when rotating having kinetic energy, a control system for the decanter centrifuge. The control system comprises:

(a) a variable frequency drive receiving power from an AC source and connected to a main drive motor, the main drive motor for rotating the bowl of the decanter centrifuge;

(b) a variable frequency drive connected to a back drive motor, the back drive motor for rotating the conveyor of the decanter centrifuge;

(c) a common DC bus connected to the variable frequency drive connected to the main drive motor and to the variable frequency drive connected to the back drive motor; and (d) means connected to the common DC bus and a stand for providing lubrication to the decanter centrifuge for controlling the lubrication stand;

the decanter centrifuge kinetic energy providing through the variable frequency drive connected to the main drive motor power for the DC bus in the absence of power from the AC source.

In combination, a decanter centrifuge comprising a bowl and a conveyor, the decanter centrifuge when rotating having kinetic energy, a control system for the decanter centrifuge. The control system comprises:

(a) a variable frequency drive receiving power from an AC source and connected to a main drive motor, the main drive motor for rotating the bowl of the decanter centrifuge;

(b) a variable frequency drive connected to a back drive motor, the back drive motor for rotating the conveyor of the decanter centrifuge;

(c) a common DC bus connected to the variable frequency drive connected to the main drive motor and to the variable frequency drive connected to the back drive motor; and (d) means connected to the common DC bus for providing lubrication to the decanter centrifuge;

the decanter centrifuge kinetic energy providing through the variable frequency drive connected to the main drive motor power for the DC bus in the absence of power from the AC source.

In a system for controlling a decanter centrifuge, the decanter centrifuge when rotating having kinetic energy. The control system comprises a variable frequency drive receiving power from an AC source and connected to a main drive motor, the main drive motor for rotating a bowl of the centrifuge; a variable frequency drive connected to a back drive motor, the back drive motor for rotating a conveyor of the centrifuge; a common DC bus connected to the variable frequency drive connected to the main drive motor and to the variable frequency drive connected to the back drive motor; and means connected to the common DC bus and for providing lubrication to the centrifuge, a method for controlling the centrifuge in the absence of power from an AC source. The method comprises:

driving both the main drive motor and the back drive motor, in the absence of power from the AC source, from power provided for the DC bus through the variable frequency drive connected to the main drive motor from the decanter centrifuge kinetic energy to simultaneously control the bowl rotation and the conveyor rotation.

DESCRIPTION OF THE DRAWING

The only drawing FIGURE, shows the centrifuge, drive motors, lube stand and a block diagram of the centrifuge control system of the present invention.

DESCRIPTION OF THE PREFERRED EMBODIMENT(S)

In accordance with the present invention the regenerated energy from a centrifuge is used in maintaining the control and auxiliary power to (1) continue centrifuge operation on short duration power losses and (2) to maintain normal shutdown control of the centrifuge when the power outages are for longer periods. In either circumstance the safety interlocks of the centrifuge are maintained.

As was described above, the centrifuge control system 10 incorporates a VFD 18 to control the centrifuge main motor 14 and a VFD 20 to control the centrifuge backdrive motor 16. Also as was described above, the DC bus 22 of VFDs 18 and 20 are connected together.

In accordance with the present invention, the power of the DC bus 22 of VFDs 18 and 20 is used to power the control system 10 and the centrifuge's auxiliary devices such as lube stand 24 and therefore the lube oil pump 24*a* and the lube cooling water solenoid valve 24*b*.

To enable this control all control power to centrifuge controller 36 needs to operate from a 24 volt DC supply or be directly powered from the VFD DC bus 22. Controller 36 maintains control over all of the components of centrifuge control system 10 and the centrifuge 12 by using programmed logic, to start, run and shutdown the centrifuge 12 in a safe, efficient and productive manner. The controller 36 provides for control over the speed of the backdrive motor 16 to maintain consistent output product by monitoring bowl speed, backdrive speed, and backdrive load. The software in controller 36 uses these values to calculate and output the correct speed setpoint to the backdrive motor variable frequency drive 20. Controller 36 monitors important criteria detrimental to the operation of the centrifuge 12. If any of these criteria exceeds programmed limits controller 36 forces actions to correct the situation or initiates a shutdown of the centrifuge 12, if required for the protection of the equipment.

The 24 volt DC power for centrifuge controller 36 is obtained by attaching, as is shown in the drawing FIGURE, a DC/DC power converter 32 to the DC bus 22. Power converter 32 accepts a wide range of input DC voltage but maintains a constant 24 volt DC output. The constant 24 volt DC output is critical to maintain the control of the centrifuge 12. The items to be powered directly from the DC bus 22 incorporate VFD's, such as VFD 38 for powering the lube stand 24, and the DC bus 40 of VFD 38 is attached to the DC bus 22.

During normal operation the main drive VFD 18 is converting three phase AC power to a DC voltage and current. This DC voltage is available on the DC bus 22 of VFD 18. The VFD 18 then converts this DC bus energy into a variable frequency AC voltage and current. This variable frequency voltage and current is used to power and rotate the main drive motor 14 and the centrifuge 12. The centrifuge 12, by design, is a high inertia load and once spinning at full speed has an enormous amount of kinetic energy.

During the abnormal situation of a power dip or power outage the kinetic energy of the rotating centrifuge 12, in combination with the VFD 18, powers the DC bus 22. Stored energy in the centrifuge 12 is converted to power. It is this power, either used directly from the DC bus or converted to 24 volt DC that is used to either (1) continue centrifuge operation on short duration power losses or (2) to maintain normal shutdown control of the centrifuge when the power outages are for longer periods.

To maintain the safety features of centrifuge 12, mainly the quick-stop contactor(s), it is necessary that circuit breakers 28 and 30 both be a re-settable circuit breaker (used strictly as a disconnecting device) that is, as is shown in the drawing FIGURE, maintained closed by 24 volt DC power but requires 120 volt AC power to reset. The use of such breakers enables distinguishing a power dip or power outage from a true quick-stop operation (opening) of the circuit breakers 28 and 30. The 120 volt AC will not be available if the three phase AC power at the input to system 10 is lost. Thus the required safety integrity of the centrifuge 12 is maintained during normal and abnormal operation.

Once a power dip becomes a power outage it is estimated that the centrifuge control system 10 will maintain control until the centrifuge 12 reaches two-thirds of its original speed. This time will vary with the size of the centrifuge and the loading but maintaining the differential speed of the centrifuge, to this point, should clear the bowl 12a of solids sufficiently to expect normal re-starting of the centrifuge, once power is restored.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A control system for a decanter centrifuge, said decanter centrifuge when rotating having kinetic energy, said control system comprising:
    (a) a variable frequency drive receiving power from an AC source and connected to a main drive motor, said main drive motor for rotating a bowl of said decanter centrifuge;
    (b) a variable frequency drive connected to a back drive motor, said back drive motor for rotating a conveyor of said decanter centrifuge;
    (c) a common DC bus connected to said variable frequency drive connected to said main drive motor and to said variable frequency drive connected to said back drive motor;
    (d) means connected to said common DC bus and a stand for providing lubrication to said decanter centrifuge for controlling said lubrication stand;
    said decanter centrifuge kinetic energy providing through said variable frequency drive connected to said main drive motor power for said DC bus in the absence of power from said AC source.

2. The control system of claim 1 further comprising:
    a circuit breaker connected between said main motor variable frequency drive and said main drive motor;
    a circuit breaker connected between said back drive motor variable frequency drive and said back drive motor;
    said means for controlling said lubrication stand providing a DC voltage have a constant predetermined amplitude;
    each of said circuit breakers maintained closed by said constant predetermined amplitude DC voltage and reset by an AC voltage derived from said AC source.

3. The control system of claim 1 wherein said means connected to said common DC bus and said lubrication stand for controlling said lubrication stand further comprises:
    a power supply connected to said DC bus for providing at its output a DC voltage having a constant amplitude;
    a variable frequency drive connected to said DC bus and said lubrication stand.

4. The control system of claim 3 wherein said lubrication stand comprises a lube oil pump and said variable frequency drive connected to said lubrication stand is connected to said lube oil pump.

5. A control system for a decanter centrifuge, said decanter centrifuge when rotating having kinetic energy, said control system comprising:
    (a) a variable frequency drive receiving power from an AC source and connected to a main drive motor, said main drive motor for rotating a bowl of said decanter centrifuge;
    (b) a variable frequency drive connected to a back drive motor, said back drive motor for rotating a conveyor of decanter centrifuge;
    (c) a common DC bus connected to said variable frequency drive connected to said main drive motor and to said variable frequency drive connected to said back drive motor;
    (d) means connected to said common DC bus for providing lubrication to said decanter centrifuge;
    said decanter centrifuge kinetic energy providing through said variable frequency drive connected to said main drive motor power for said DC bus in the absence of power from said AC source.

6. The control system of claim 5 further comprising:
    a circuit breaker connected between said main motor variable frequency drive and said main drive motor;
    a circuit breaker connected between said back drive motor variable frequency drive and said back drive motor;
    said means connected to said common DC bus for providing lubrication to said decanter centrifuge providing a DC voltage have a constant predetermined amplitude;
    each of said circuit breakers maintained closed by said constant predetermined amplitude DC voltage and reset by an AC voltage derived from said AC source.

7. The control system of claim 5 further comprising a power supply connected to said DC bus for providing at its output a DC voltage having a constant amplitude.

8. The control system of claim 7 wherein said means connected to said common DC bus for providing lubrication to said decanter centrifuge comprises a lubrication stand and a variable frequency drive connected to said lubrication stand and said DC bus.

9. The control system of claim 8 wherein said lubrication stand comprises a lube oil pump and said variable frequency drive connected to said lubrication stand is connected to said lube oil pump.

10. In combination,
    a decanter centrifuge comprising a bowl and a conveyor, said decanter centrifuge when rotating having kinetic energy, a control system for said decanter centrifuge comprising:
    (a) a variable frequency drive receiving power from an AC source and connected to a main drive motor, said main drive motor for rotating said bowl of said decanter centrifuge;
    (b) a variable frequency drive connected to a back drive motor, said back drive motor for rotating said conveyor of said decanter centrifuge;
    (c) a common DC bus connected to said variable frequency drive connected to said main drive motor and to said variable frequency drive connected to said back drive motor; and
    (d) means connected to said common DC bus and a stand for providing lubrication to said decanter centrifuge for controlling said lubrication stand;
    said decanter centrifuge kinetic energy providing through said variable frequency drive connected to said main drive motor power for said DC bus in the absence of power from said AC source.

11. The combination of claim 10 wherein said control system for said decanter centrifuge further comprises:
    a circuit breaker connected between said main motor variable frequency drive and said main drive motor;

a circuit breaker connected between said back drive motor variable frequency drive and said back drive motor;

said means for controlling said lubrication stand providing a DC voltage have a constant predetermined amplitude;

each of said circuit breakers maintained closed by said constant predetermined amplitude DC voltage and reset by an AC voltage derived from said AC source.

12. The combination of claim 10 wherein said control system for said decanter centrifuge further comprises a power supply connected to said DC bus for providing at its output a DC voltage having a constant amplitude.

13. In combination, a decanter centrifuge comprising a bowl and a conveyor, said decanter centrifuge when rotating having kinetic energy, a control system for said decanter centrifuge comprising:

(a) a variable frequency drive receiving power from an AC source and connected to a main drive motor, said main drive motor for rotating said bowl of said decanter centrifuge;

(b) a variable frequency drive connected to a back drive motor, said back drive motor for rotating said conveyor of said decanter centrifuge;

(c) a common DC bus connected to said variable frequency drive connected to said main drive motor and to said variable frequency drive connected to said back drive motor; and (d) means connected to said common DC bus for providing lubrication to said decanter centrifuge;

said decanter centrifuge kinetic energy providing through said variable frequency drive connected to said main drive motor power for said DC bus in the absence of power from said AC source.

14. The combination of claim 13 wherein said control system for said decanter centrifuge further comprises:

a circuit breaker connected between said main motor variable frequency drive and said main drive motor;

a circuit breaker connected between said back drive motor variable frequency drive and said back drive motor;

said means connected to said common DC bus for providing lubrication to said decanter centrifuge providing a DC voltage have a constant predetermined amplitude;

each of said circuit breakers maintained closed by said constant predetermined amplitude DC voltage and reset by an AC voltage derived from said AC source.

15. The combination of claim 13 wherein said control system for said decanter centrifuge further comprises a power supply connected to said DC bus for providing at its output a DC voltage having a constant amplitude.

\* \* \* \* \*